April 6, 1926.  
J. C. LITTLEJOHN  
1,579,772  
SUPPLEMENTARY HEADLIGHT DEVICE  
Filed Feb. 24, 1925  2 Sheets-Sheet 1
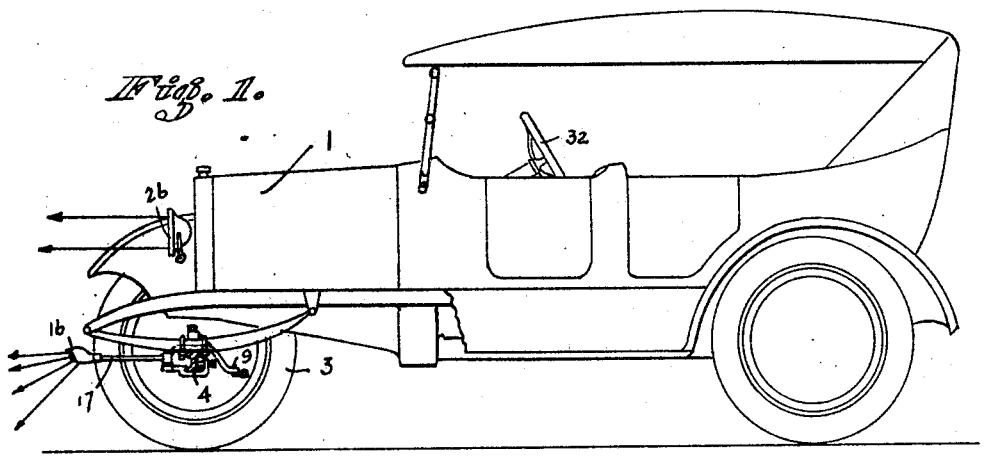
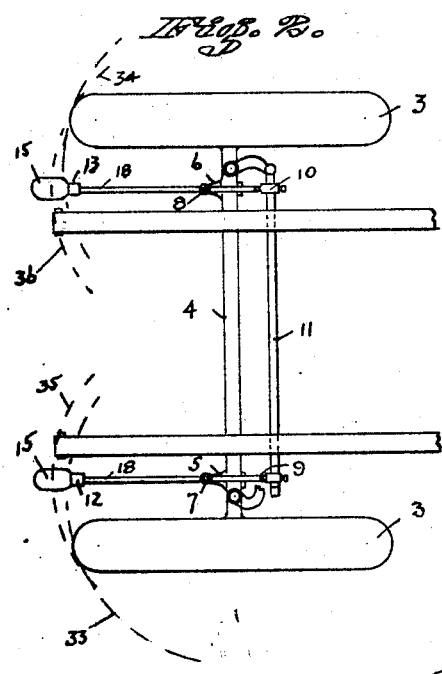
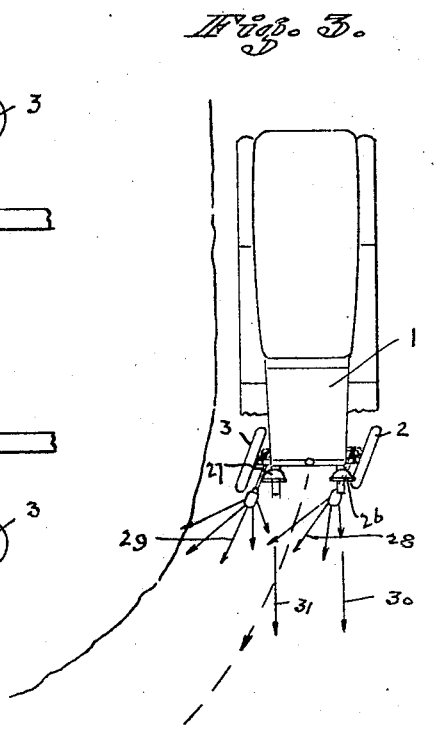
INVENTOR.  
James C. Littlejohn  
BY  
ATTORNEYS.

April 6, 1926. 1,579,772
J. C. LITTLEJOHN
SUPPLEMENTARY HEADLIGHT DEVICE
Filed Feb. 24, 1925 2 Sheets-Sheet 2
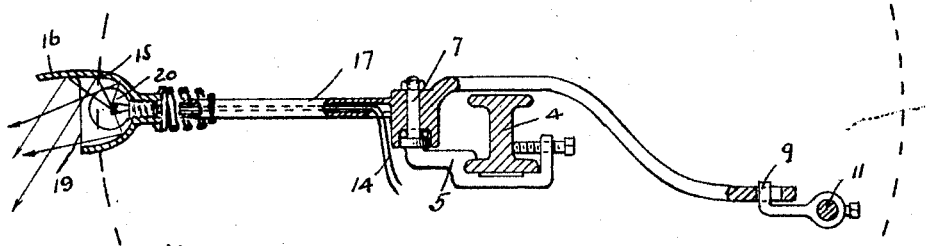
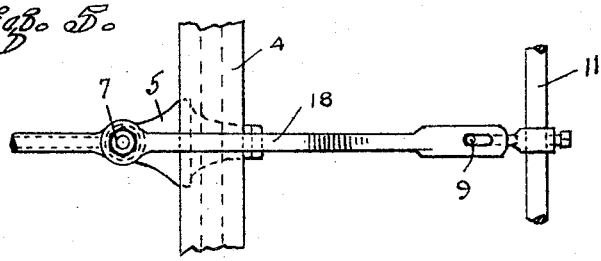
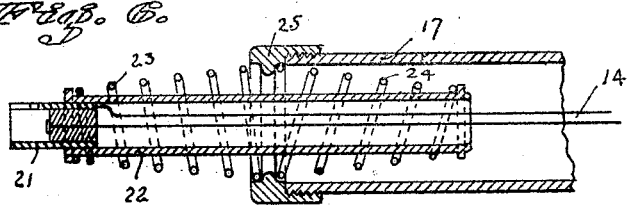
INVENTOR.
James C Littlejohn
BY
ATTORNEYS.

Patented Apr. 6, 1926.

1,579,772

UNITED STATES PATENT OFFICE.

JAMES C. LITTLEJOHN, OF SAN FRANCISCO, CALIFORNIA.

SUPPLEMENTARY-HEADLIGHT DEVICE.

Application filed February 24, 1925. Serial No. 11,044.

*To all whom it may concern:*

Be it known that I, JAMES C. LITTLEJOHN, citizen of the United States, residing at San Francisco, county of San Francisco, State of California, have invented new and useful Improvements in Supplementary-Headlight Devices, of which the following is a specification.

My invention has for its object means for illuminating the road immediately in front of and at the side of the front wheels of a vehicle.

Another object is a device of the character described adapted to swing in accordance with the side or steering movement of the front wheels of an automobile.

Another object is a device of the character described wherein an electric lamp is resiliently mounted on a supporting member which member is adapted to swing in accordance with the steering movement of the front wheels of a vehicle.

Other objects will appear from the drawings and specification.

These objects I attain by pivotally supporting from the front axle of a vehicle a laterally movable arm about said pivotal axis and on the end of the said arm a light projector and connections between the steering mechanism of the vehicle and the said arm whereby the arm is moved synchronously with the steering movement of the vehicle wheels.

By referring to the accompanying drawings my invention will be made clear.

Referring to the drawings.

Fig. 1 is a side view of an automobile with the near front wheel removed to show the mounting of my device on the front axle thereof.

Fig. 2 is a fragmentary plan view of the front portion of Fig. 1 with the automobile body removed.

Fig. 3 is a plan view of an automobile making a turn and showing the road illumination by my device as compared with the illumination from conventional rigid headlights.

Fig. 4 is a cross sectional view through a vehicle front axle showing the bracket arm and projector means mounted thereon and with connecting means for swinging the arm and projector from the steering mechanism of the car.

Fig. 5 is a fragmentary plan view of certain parts of Fig. 4.

Fig. 6 is a cross section through the end of the arm and the lamp socket with resilient supporting means therebetween and showing electrical connections to the lamp.

Throughout the figures similar numerals refer to identical parts.

A conventional automobile body is shown by the numeral 1 having front wheels 2, 3, respectively mounted upon the axle 4.

Extending from the axle 4 are the bracket members 5, 6 carrying pivots 7, 8 and on each of these pivots are double swinging arm members 17 and 18 pivotally connected at 9, 10 respectively to the steering cross rod 11 and on the other end of these arms at 12, 13 respectively is mounted an electric lamp.

These lamps are energized by conventional connections 14 and are provided with any suitable reflector 15 preferably one having an extended portion 16 adapted to reflect a large percentage of the light downward as best shown in Fig. 4.

The arm portion 17 is preferably made of a length such that the lamp and its reflector extend beyond the front wheel so that dirt, mud, etc. thrown therefrom will not enter the reflector or damage the lamp, and also to prevent light rays above the horizontal plane and hence to prevent glare. Figure 4 shows the above arrangement, the position of the vehicle wheel being indicated by the dotted circle.

The lens or cover glass 19 may be further employed if desired.

As a protection against damage to the filament of the lamp 20 by vibration caused during the travel on the roads I prefer to suspend the lamp resiliently with respect to the arm 17.

One form of such resilient suspension is indicated as connected with the lamp socket 21, in Fig. 6.

This socket is mounted in the suplementary tube 22 through which the connections 14 are passed. The tube is suspended between a pair of coil springs 23, 24 respectively which springs on their opposite ends are fixed to the head member 25 which forms a terminal portion for the arm 17.

Other forms of resilient suspension may be employed whereby the vibration or jar from the axle 4 is cushioned or relieved before it reaches the lamp socket 21. In this way the lamp filament is protected from breakage whereas its position is at all times retained in axial alignment with the arm 17.

Any conventional forms of switch and electric wiring may be adapted whereby the lamps may be illuminated to suit the specific requirements of driving; either in circuit with the headlights 26, 27 or independent thereof.

It will now be understood that with my supplementary headlight device the road will be illuminated at each side immediately in front of each of the front wheels of a vehicle and that the said illumination will because of the synchronous turning of the arms of the device with the front wheels when the steering gear is operated be an illumination immediately in front and in the direction of the turning indicated by the arrows 28, 29 respectively as distinguished from the conventional headlight illumination indicated by the arrows 30, 31.

The operation is as follows:

As the steering wheel 32 of the automobile 1 is moved the front wheels will through conventional connections, not shown but well known, be caused to swing in the arcs 33, 34 (see Figs. 1 and 2) and because of the operation of the connecting rod 11 the pivot members 9 and 10 will cause the arms 17—18 to move the projectors 15—15 in the arcs 35, 36 respectively thereby following the movement of the wheel and retaining a road illumination to the front and side of the wheels as shown by the arrows 28, 29 is Fig. 3.

I claim:

1. A supplementary dirigible headlight device for a road vehicle including a horizontally supported arm and a horizontal extension from said arm carrying a lamp, said extension being resiliently supported on said arm for limited universal movement relative thereto.

2. A supplementary dirigible headlight device for a road vehicle including a horizontal supported tubular arm, an extension projecting from within said arm and carrying a lamp at its free end, and a spiral spring surrounding said extension contacting at one end with the extension and at the other end with the arm and supporting the extension in complete floating relation to the arm.

JAMES C. LITTLEJOHN.